US005662283A

United States Patent [19]
Puryear et al.

[11] Patent Number: 5,662,283
[45] Date of Patent: *Sep. 2, 1997

[54] FISHING REEL WITH LINE HOLDING FEATURE

[75] Inventors: John W. Puryear, Bay St. Louis, Miss.; Robert L. Carpenter, Tulsa, Okla.; John A. Zurcher, Spirit Lake, Iowa; Hyunkyu Kim, Broken Arrow, Okla.

[73] Assignee: Zebco Corporation, Tulsa, Okla.

[*] Notice: The term of this patent shall not extend beyond the expiration date of Pat. No. 5,620,149.

[21] Appl. No.: 440,641

[22] Filed: May 15, 1995

Related U.S. Application Data

[63] Continuation-in-part of Ser. No. 914,261, Jul. 15, 1992, abandoned, and Ser. No. 916,226, Jul. 15, 1992, abandoned.

[51] Int. Cl.$^6$ .................................................. A01K 89/01
[52] U.S. Cl. ............................................ 242/233; 242/232
[58] Field of Search ................................... 242/230, 231, 242/232, 233

[56] References Cited

U.S. PATENT DOCUMENTS

| | | | |
|---|---|---|---|
| 4,921,188 | 5/1990 | Smith | 242/233 |
| 5,154,369 | 10/1992 | Smith | 242/233 |
| 5,346,157 | 9/1994 | Kaneko | 242/232 |
| 5,458,296 | 10/1995 | Kaneko | 242/232 |

*Primary Examiner*—Katherine Matecki
*Attorney, Agent, or Firm*—Wood, Phillips, VanSanten, Clark & Mortimer

[57] ABSTRACT

A fishing reel having a frame, a rotor mounted to the frame for rotation about an axis, a line storage spool, structure for rotating the rotor, structure on the rotor for directing line onto the line storage spool as an incident of the rotor being rotated about its axis and including a bail assembly having first and second bail arms mounted to the rotor for pivotable movement between (a) a first position wherein the bail assembly is in a retrieve position and (b) a second position wherein the bail assembly is in a cast position, a bail actuator connected to at least one of the frame and rotor for movement between (a) a first position wherein the bail assembly is in a retrieve position and (b) a second position wherein the bail assembly is in a cast position, a bail actuator connected to at least one of the frame and rotor for movement between rest and operating positions, cooperating structure between the bail actuator and bail assembly for movement of the bail assembly from its retrieve position into its cast position as an incident of the bail actuator moving from its rest position into its operating position, and line holding structure for selectively preventing line from freely paying off of the line storage spool with the bail assembly in a cast position. The line holding structure includes a third arm pivotably attached to the rotor for movement between third and fourth positions and a fourth arm pivotably attached to the third arm. At least one of the third and fourth arms is engageable with line projecting off of the spool with the bail assembly in a cast position to thereby prevent line from freely paying off of the line storage spool.

21 Claims, 8 Drawing Sheets

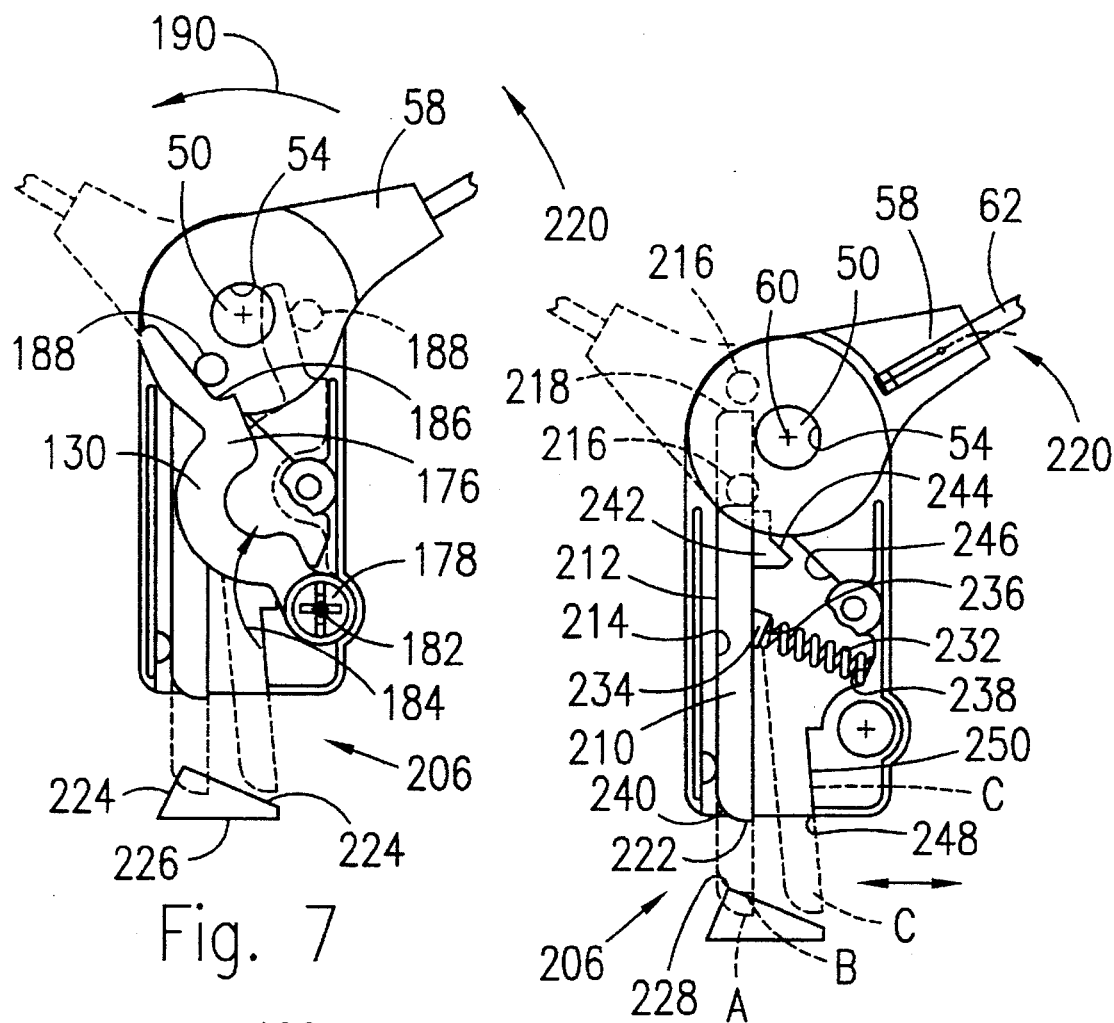
Fig. 7
Fig. 8
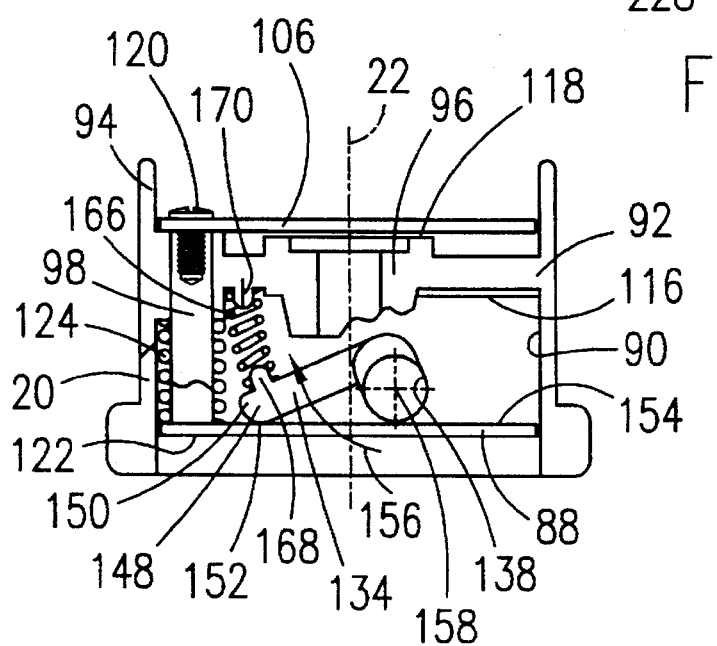
Fig. 9
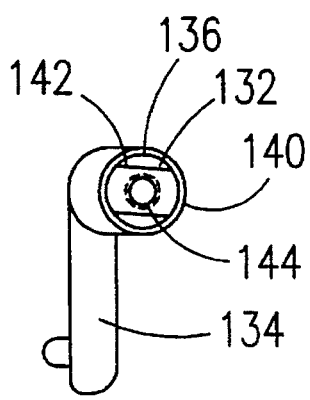
Fig. 10

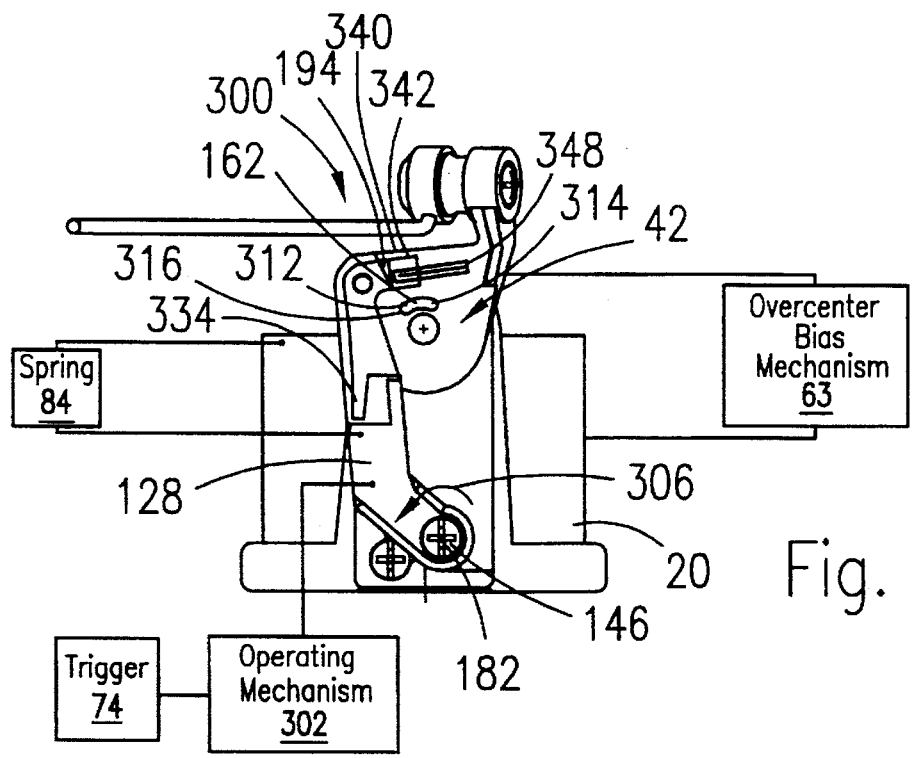
Fig. 20
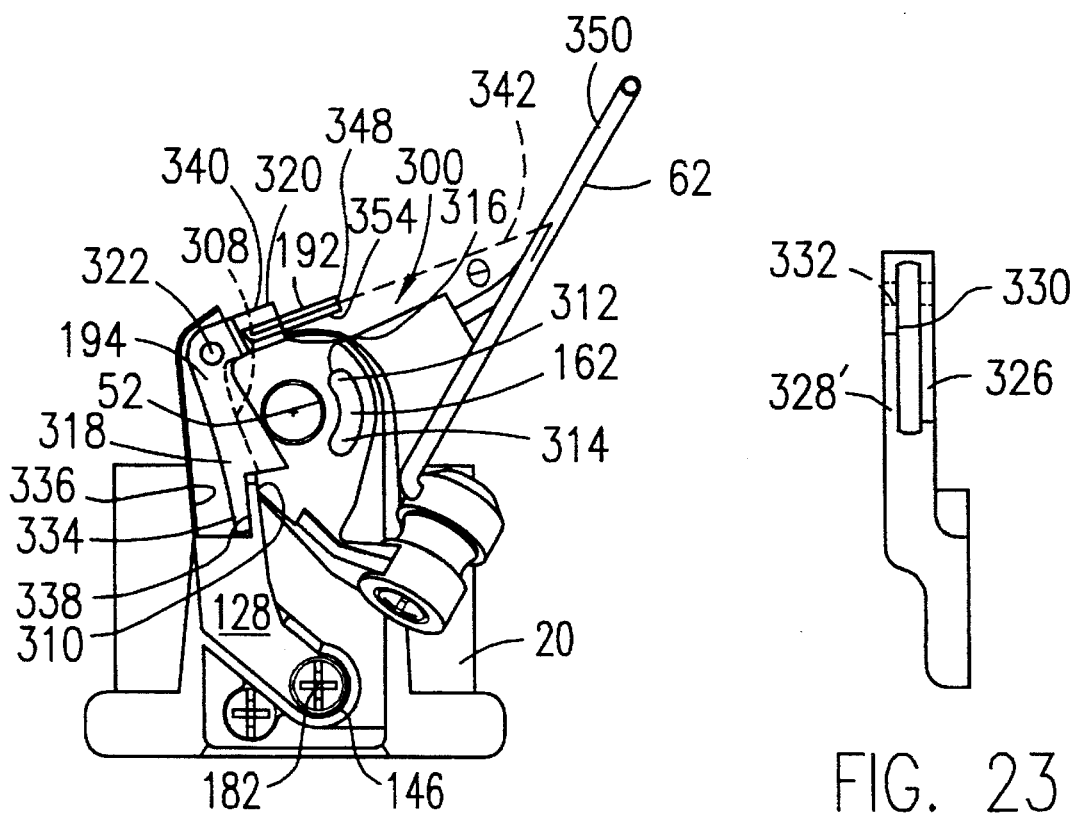
Fig. 22
FIG. 23

FISHING REEL WITH LINE HOLDING FEATURE

CROSS-REFERENCE

This application is a continuation-in-part of application Ser. Nos. 07/914,261 and 07/916,226, now abandoned, both filed Jul. 15, 1992.

BACKGROUND OF THE INVENTION

1. Field of the Invention

This invention relates to spinning-type fishing reels having a bail assembly that is pivotable between cast and retrieve positions and, more particularly, to a line holding mechanism associated with the bail assembly for selectively preventing line from freely paying out of the reel with the bail assembly in the cast position.

2. Background Art

Spinning-type fishing reels are well known in the prior art. Typically, a spinning reel has a frame defining a mounting foot for attachment to a rod. A rotor is mounted to the frame for rotation about a fore and aft axis. A line-carrying spool is co-axial with the rotor axis and oscillated in a fore and aft direction by operation of a crank handle, which crank handle operation simultaneously rotates the rotor to thereby evenly wrap line on the line-carrying spool.

To effect a cast with a basic spinning reel, the user picks up the line projecting away from the reel, with a finger on the same hand that holds the rod, and snubs the line against the rod. With the other hand, the user manually pivots the bail assembly from a retrieve position to a cast position. The rod is then cocked and thrust in the direction of the cast. As the rod is thrust, the user moves the line snubbing finger to release the line. Once the cast is completed, the user operates the crank handle to rotate the rotor. A trip mechanism on the moving rotor is automatically actuated by a cam element on the reel frame to force the bail assembly from the cast position back into the retrieve position.

Some fishermen do not like to have to manually grasp and reorient the bail assembly, as is required with the above structure. To accommodate these fishermen, trigger operated bail assemblies have been developed. One such mechanism us shown in U.S. Pat. No. 4,676,450, to Carpenter et al. This structure employs a rotor mounted trigger that is pivotable to cam the bail assembly from its retrieve position into its cast position. Reels incorporating this invention have proven to be highly commercially successful.

The main drawback with rotor mounted triggers is that the trigger is accessible through only a limited range of positions for the rotor. Consequently, a centering mechanism is normally incorporated into fishing reels with the rotor mounted triggers. The user is required to back the crank handle up with the rotor rotation being arrested as the trigger situates immediately under the rod.

To obviate this centering problem, it is known to mount a trigger on a fixed portion of one of the rod and reel. Certain of these triggers are operable regardless of the rotational position of the rotor. Exemplary trigger mechanism are shown in each of U.S. Pat. Nos. 2,658,697, to Steinbaugh, 3,095,158, to Louison, 3,796,391, to McMickle, and 3,908,927, to Louison.

All of the above prior art structures require that the user manually snub the line against the rod during the performance of a cast.

In recent years, the assignee herein introduced to the market a very significant development in the trigger area. Some of the applicant's contribution is described in U.S. Pat. No. 4,921,188, to Smith. The Smith structure utilizes a pin which automatically traps the line on the bail assembly as the reel is placed in a cast mode. The user merely has to operate a trigger which effects (a) pivoting of the bail from its retrieve position into its cast position and (b) positioning of the pin to block the line on the bail assembly. The user releases the trigger as the rod is thrust forwardly to thereby retract the pin and allow the line to pay out. With this construction, the user never has to directly touch the line to perform a cast. This invention has met with tremendous commercial success. The applicant herein continues to refine and improve various aspects of this basic structure.

SUMMARY OF THE INVENTION

The present invention is specifically directed to overcoming the above enumerated problems and improving the presently known bail operating mechanisms.

More particularly, the present invention is directed to a fishing reel having a frame, a rotor mounted to the frame for rotation about an axis, a line storage spool, structure for rotating the rotor, structure on the rotor for directing line onto the line storage spool as an incident of the rotor being rotated about its axis and including a bail assembly having first and second bail arms mounted to the rotor for pivotable movement between (a) a first position wherein the bail assembly is in a retrieve position and (b) a second position wherein the bail assembly is in a cast position, a bail actuator connected to at least one of the frame and rotor for movement between (a) a first position wherein the bail assembly is in a retrieve position and (b) a second position wherein the bail assembly is in a cast position, a bail actuator connected to at least one of the frame and rotor for movement between rest and operating positions, cooperating structure between the bail actuator and bail assembly for movement of the bail assembly from its retrieve position into its cast position as an incident of the bail actuator moving from its rest position into its operating position, and line holding structure for selectively preventing line from freely paying off of the line storage spool with the bail assembly in a cast position. The line holding structure includes a third arm pivotably attached to the rotor for movement between third and fourth positions and a fourth arm pivotably attached to the third arm. At least one of the third and fourth arms is engageable with line projecting off of the spool with the bail assembly in a cast position to thereby prevent line from freely paying off of the line storage spool.

In one form, the third and fourth arms are pivotable about substantially parallel axes.

In one form, the third arm is a force transmission arm and the structure cooperating between the bail actuator and the bail assembly includes structure cooperating between the bail actuator and the force transmission arm for moving the force transmission arm from its third position into its fourth position as an incident of the bail actuator moving from its rest position into its operating position and further structure cooperating between the bail assembly and force transmission arm for moving the bail assembly from its retrieve position into its cast position as an incident of the force transmission arm moving from its third position into its fourth position.

In a preferred form, at least one of the third and fourth arms has a pin projecting in cantilever fashion therefrom, and with the bail assembly in the cast position and the bail actuator in the operating position, the pin on the at least one of the third and fourth arms engages the bail assembly.

In one form, the structure cooperating between the bail assembly and force transmission arm is a projection on the bail assembly and a shoulder on the force transmission arm.

In one form, at least one of the third and fourth arms has first and second transverse legs, with the first leg having an edge for engaging the projection on the bail assembly. The projection on the bail assembly abuts the edge on the first leg at first and second spaced locations as the bail actuator causes the bail assembly to move from its retrieve position into its cast position. The first and second locations are spaced at different distances from the rotational axis of the one of the third and fourth arms.

The other of the third and fourth arms has a pin projecting in cantilever fashion therefrom and, with the bail assembly in the cast position and the bail actuator in the operation position, the pin on the other of the third and fourth arms engages the bail assembly. The second location is spaced further from the rotational axis of the one of the third and fourth arms than the first location so that the projection produces a large torque on the other of the third and fourth arms upon engaging the other of the third and fourth arms at the second location than at the first location in urging the pin on the other of the third and fourth arms towards the bail assembly.

In a preferred form, the projection engages the other of the third and fourth arms first at the first location and then at the second location as the bail assembly moves from the retrieve position into the cast position.

With the above structure, the pin-carrying arm is caused to be pivoted with a greater torque as the bail assembly approaches the cast position. With a line holding structure that bears a line holding pin against the bail, this additional torque can be used to positivley snub the pin to the bail to prevent inadvertent escape of the line from the line holding receptacle.

The separate pivot connection of the pin carrying arm is desirable for any of a variety of reasons. To release the line from the line holding receptacle with the bail assembly in the cast position, the line holding pin is angled to let the line slide therealong and off of the free end to allow free line payout. It is desirable to have a quick pin response so that the line does not hang up as the user thrusts the rod in the direction of the cast. With a one-piece arm, the single arm serves the dual functions of rotating the bail assembly and situating the pin in the line holding position. To develop the required torque on the bail assembly, the pivot axis for the arm is normally placed a significant distance from the bail arm against which it acts. The line holding pin is normally even further away from the pivot axis for the arm. The result is that the arm must pivot through a substantial distance before the line holding pin can be reoriented sufficiently to release the line. This may produce a substantial lag time, which is obviously undesirable.

Further, according to the invention, the bail projection engages the other of the third and fourth arms with the pin on the other of the third and fourth arms engaging the bail assembly with the bail assembly in its cast position.

This arrangement allows the line holding pin to be positively snubbed to the bail assembly.

In one form of the invention, the projection has a U-shaped configuration with spaced first and second legs having first and second spaced free edges that engage the other of the third and fourth arms at the first and second locations.

In one form of the invention, the second arm is pivotable relative to the first arm through a range of at least fifteen degrees, with there being structure cooperating between the third and fourth arms to limit the range of relative movement between the third and fourth arms.

The invention further contemplates a fishing reel having a frame, a rotor mounted to the frame for rotation about a first axis, a line storage spool, a bail assembly rotatable with the rotor to direct line onto the line storage spool and being pivotable relative to the rotor between a retrieve position and a cast position, a bail actuator connected to at least one of the frame and rotor for movement between rest and operating positions, structure cooperating between the bail actuator and bail assembly for moving the bail assembly from its retrieve position into its cast position as the bail actuator moves from its rest position to its operating position, and a line holding structure for selectively preventing line from freely paying off the line storage spool with the bail assembly in a cast position. The line holding structure includes a third arm, attached to the rotor for movement relative thereto between third and fourth positions, and a fourth arm. The fourth arm is selectively engageable with line projecting off of the line carrying spool with the bail assembly in a cast position and the fourth arm in a line-engaging position to thereby prevent line from freely paying off of the line storage spool. At least part of the fourth arm is movable relative to the third arm to facilitate payout of line from the line carrying spool with the fourth arm moved out of the line-engaging position and the bail assembly in the cast position.

In one form, the third arm is normally biased away from the fourth position therefor. In a preferred form, the third arm is biased so that the fourth arm portion is moved away from its line-engaging position.

In one form, the fourth arm is pivotably connected to the third arm and has a pin thereon that, with the fourth arm in a line-engaging position, is engageable with line projecting off the line carrying spool, with the bail assembly in the cast position, to prevent line from freely paying off of the line storage spool.

In one form, the fourth arm is L-shaped with first and second transverse legs and the fourth arm is pivotably attached to the third arm for rotation about an axis that is located adjacent to the juncture of the first and second legs.

In one form, the third arm has first and second walls defining a receptacle therebetween and the fourth arm resides at least partially within the receptacle between the first and second walls.

In one form, the fishing reel has a front and rear and the third arm is pivotably attached to the rotor for rotation about a second axis and the fourth arm is pivotably attached to the third arm for rotation about a third axis, with the third axis being forwardly of the second axis.

The structure cooperating between the bail actuator and bail assembly may include a projection on one of the bail assembly and third arm and a shoulder on the other of the bail assembly and third arm, with the projection residing between the second and third axes.

BRIEF DESCRIPTION OF THE DRAWINGS

FIG. 7 is an enlarged, side elevation view of one bail arm on the bail assembly in relationship to one of two force transmission arms used to effect rotation of the bail assembly and further showing a trip mechanism, according to the present invention, for preventing jamming of the bail assembly as it moves from a retrieve position to a cast position;

FIG. 8 is a view as in FIG. 7 with the force transmission arm removed;

FIG. 9 is a sectional view of the rotor showing a translatable plate assembly for transmitting an operating force from the trigger to the force transmission arms;

FIG. 10 is a side elevation view of an internal part of one of the force transmission arms;

FIG. 20 is an enlarged side elevation view of the rotor on the fishing reel in FIG. 1, with the bail assembly thereon in a retrieve position;

FIG. 22 is a view as in FIG. 21 with the line holding mechanism retracted to allow line to pay freely off the reel; and FIG. 23 is an elevation view of a force transmission arm that pivots to urge the bail assembly from its retrieve position into its cast position.

DETAILED DESCRIPTION OF THE DRAWINGS

Figure 1:
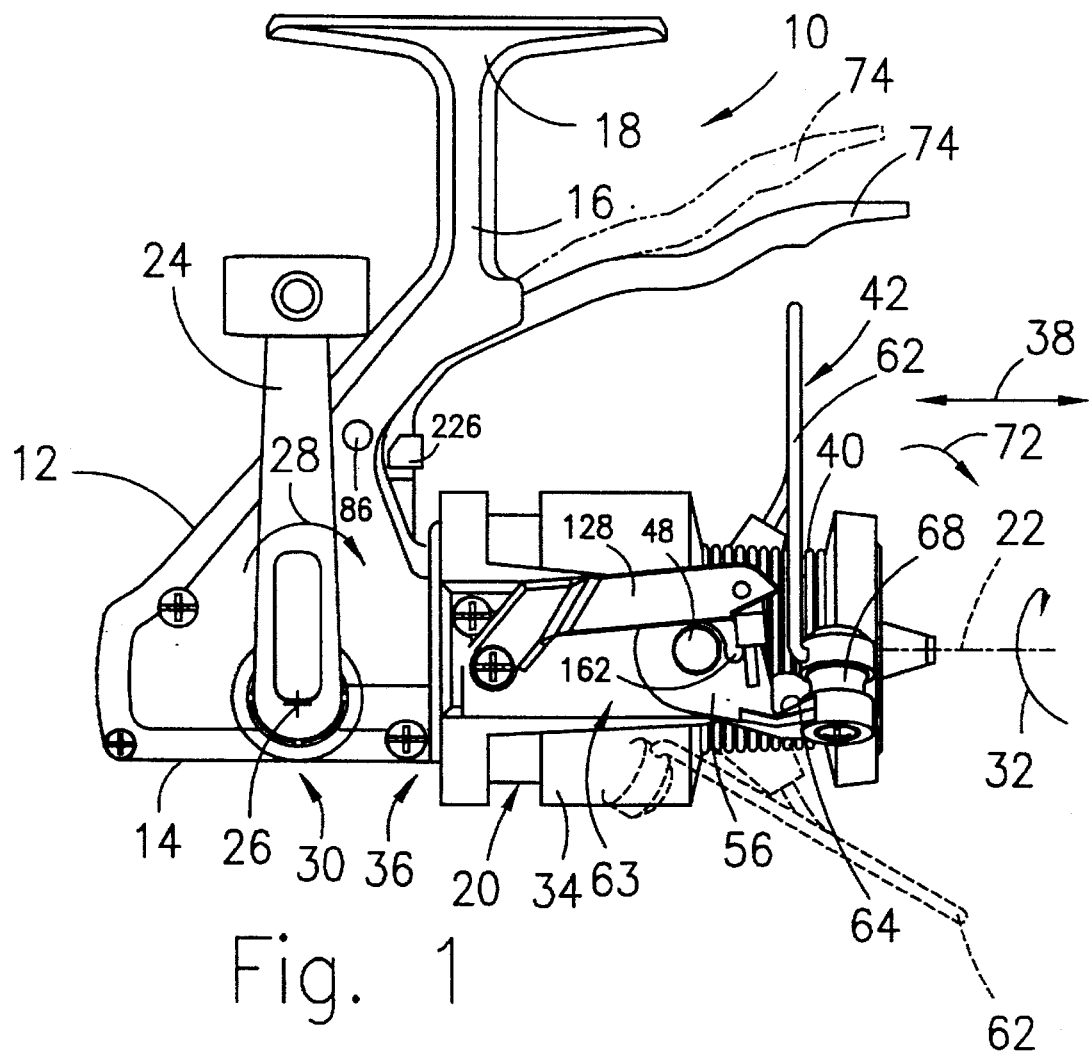
FIG. 1 is a side elevation view of a spinning-type fishing reel incorporating a bail assembly operating mechanism according to the present invention.

In FIGS. 1–13, a spinning-type fishing reel is shown at 10 having incorporated therein a preferred form of bail operating mechanism according to the present invention. Before the details of the invention are described, the overall reel operation will be briefly described to set the environment for the present invention.

The spinning reel 10 has a frame 12 with a housing 14 that contains the internal operating mechanism for the reel 10. A detailed description of the reel operating mechanism is unnecessary to understand the present invention. A detailed description of the operating mechanism is given in U.S. Pat. No. 4,676,450, which is incorporated herein by reference.

The frame housing 14 extends upwardly to define a mounting stem 16, which terminates in a mounting foot 18 that can be attached to a fishing rod (not shown) in conventional fashion.

The frame 12 carries a rotor 20 at its forward end. The rotor 20 is mounted to the frame 12 for rotation about a fore and aft axis 22. Rotation is imparted to the rotor 20 by a crank handle 24. Rotation of the crank handle 24 about a laterally extending axis 26, in the direction of arrow 28, through an internal operating mechanism, shown generally at 30 in FIG. 1, effects rotation of the rotor 20 about the axis 22 in the direction of arrow 32, i.e. in a clockwise direction as viewed from the front of the reel 10.

The rotor 20 is configured to direct line onto a line carrying spool 34 in a wrapping motion. An internal oscillating mechanism shown generally at 36 in FIG. 1, also operated by the crank handle 24, moves the spool 34 in a reciprocating fore and aft path, as indicated by the double-headed arrow 38, so that line 40 is distributed evenly along the length of the line carrying spool 34.

Line 40 is wrapped around the spool 34 by a bail assembly at 42. The bail assembly 42 is attached to the rotor 20 and, more particularly, to mounting ears 44,46 at diametrically opposite locations on the rotor 20. The mounting ears 44,46 have laterally outwardly extending mounting posts 48,50 which project into through bores 52,54 on bail arms 56,58, respectively, to thereby support the bail arms 56,58 for pivoting movement about a common axis 60. A U-shaped bail wire 62 has its ends connected to the bail arms 56,58 so that the bail arms 56,58 and bail wire 62 rotate as a unit between the retrieve position, shown in solid lines in FIG. 1, and the cast position, shown in phantom lines in that same figure. An overcenter bias structure, shown generally at 63 in FIGS. 1 and 3, drives the bail assembly into each of the cast and retrieve positions as the bail assembly approaches each. Suitable overcenter bias structures are well known to those skilled in the art.

The bail arm 56 has a line receptacle 64 defined cooperatively by a wall 66 on the bail arm 56 and a line roller 68. The receptacle 64 is generally U-Shaped and opens in the direction of advancement of the rotor 20 during line retrieval.

The line 40 normally projects from the spool 34 through an opening 70 defined at the juncture of the wall 66 and line roller 68. The line roller 68 guides line 40 that is paying out as the spool 34 rotates with the rotor 20 stationary, as when a fish overcomes the normal drag force exerted on the spool 34. As the rotor 20 is rotated in the direction of arrow 32, to retrieve the line 40, the line 40 slides down the line roller 68 and into the receptacle 64, whereupon the wall 64 and/or line roller 68 draw the line 40 around the oscillating spool 34.

Figure 2:
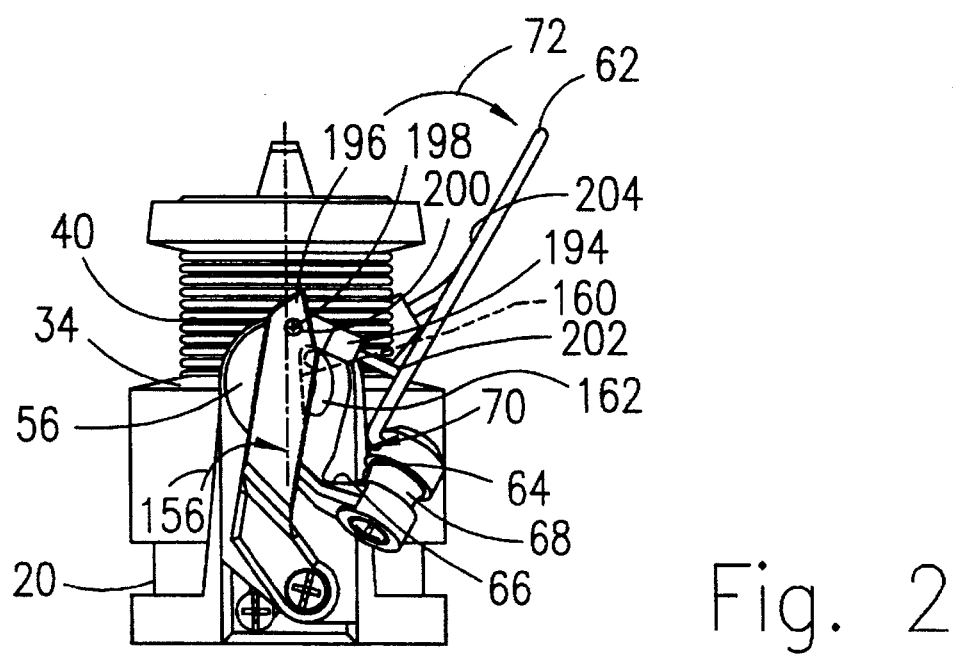
FIG. 2 is an enlarged, side elevation view of a rotor on the reel in FIG. 1 with the bail assembly thereon in a cast position.
Figure 3:
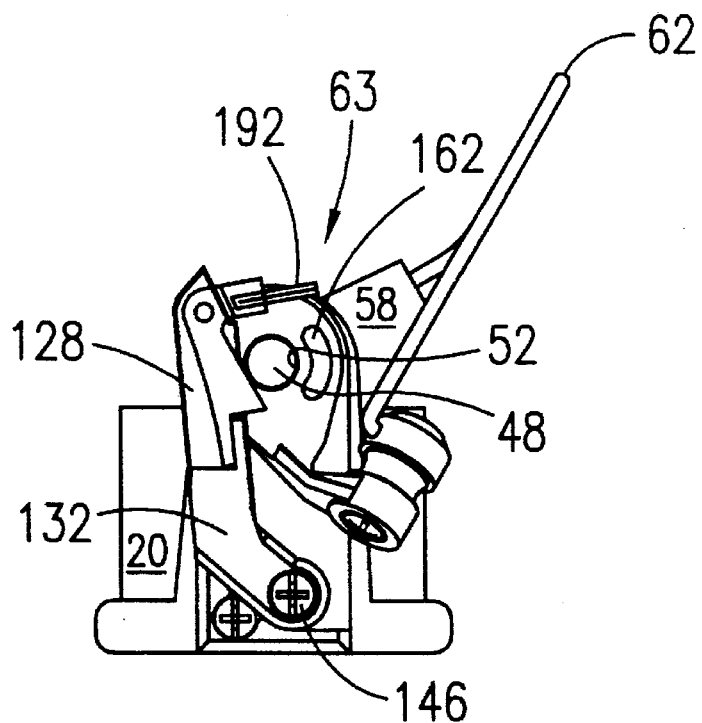
FIG. 3 is a view as in FIG. 2 with a force transmission arm partially broken away and pivoted to expose the cooperating structure on the force transmission arm and the bail assembly.
Figure 4:
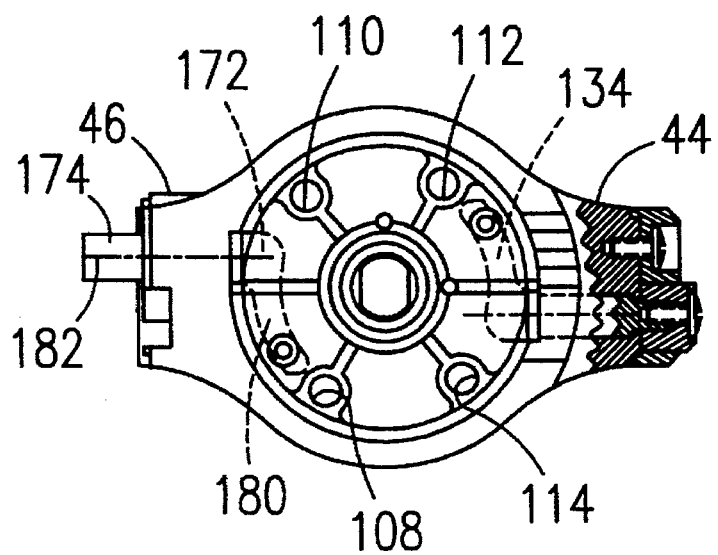
FIG. 4 is an enlarged, rear elevation view of the rotor.
Figure 5:
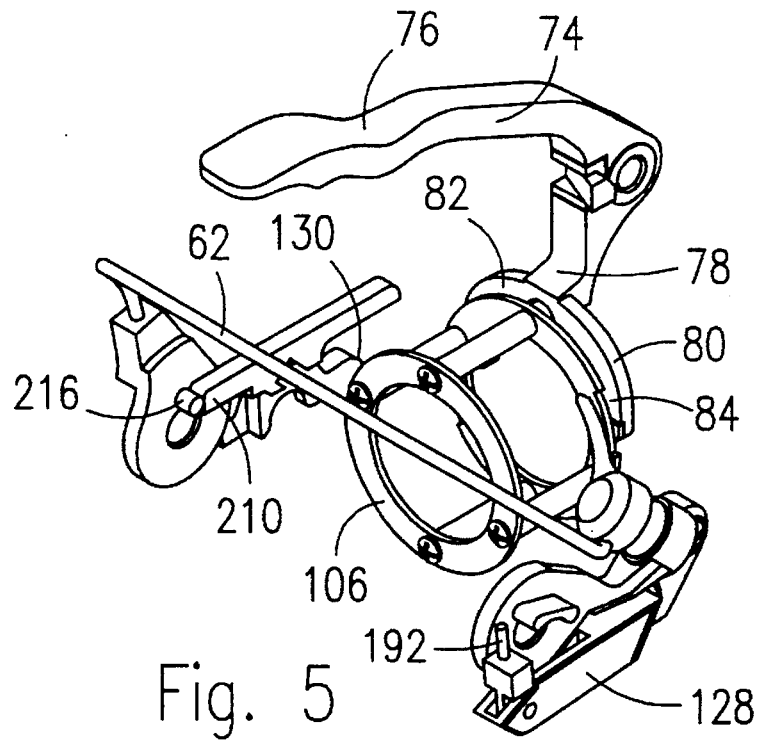
FIG. 5 is an isolated perspective view of the bail operating mechanism, according to the present invention, in a cast mode.
Figure 6:
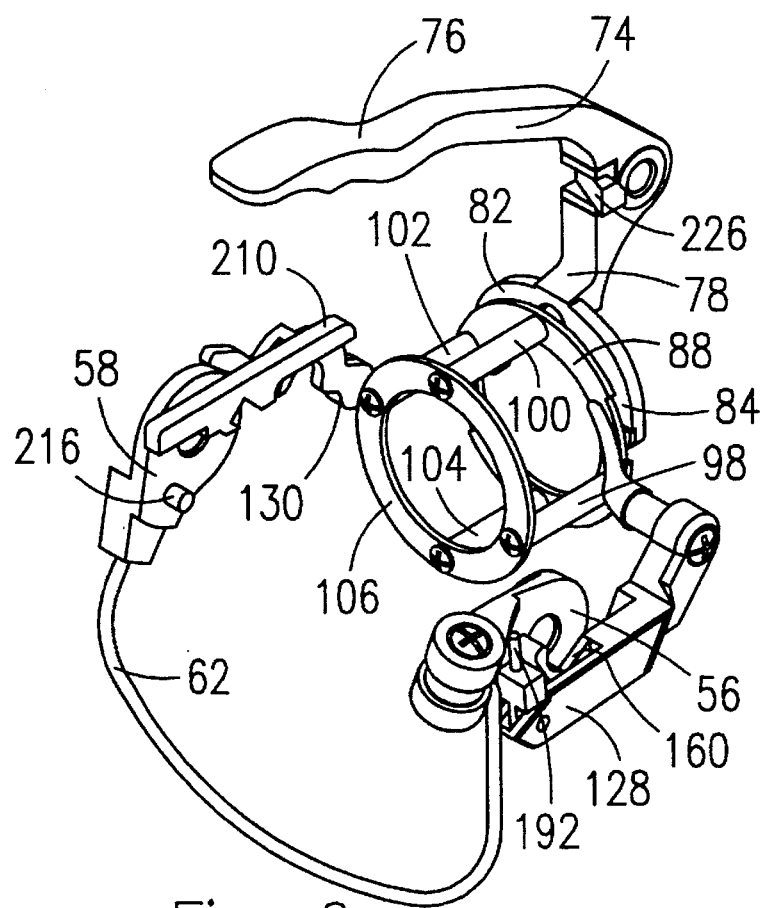
FIG. 6 is a view as in FIG. 5 with the bail assembly in a retrieve mode.
Figure 11:
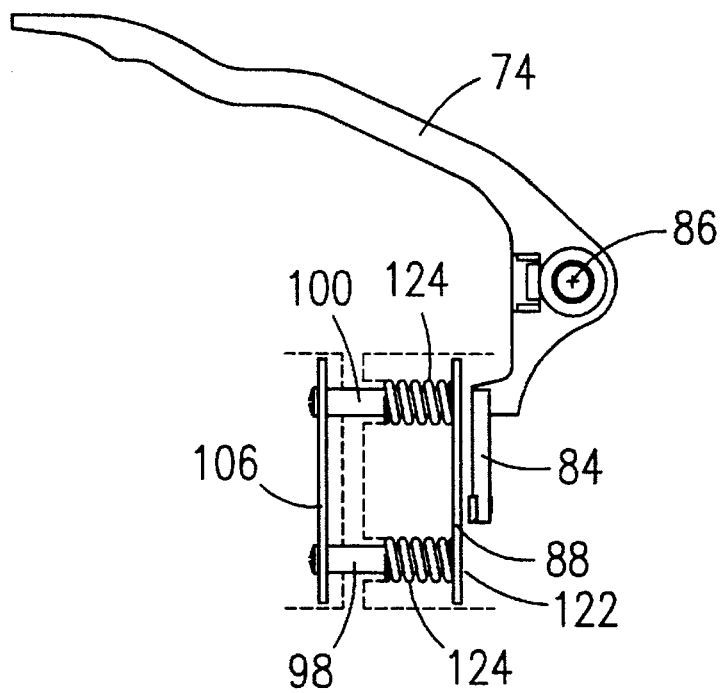
FIG. 11 is an isolated, side elevation view of the trigger in relationship to the plate assembly and with the trigger in a rest position.
Figure 12:
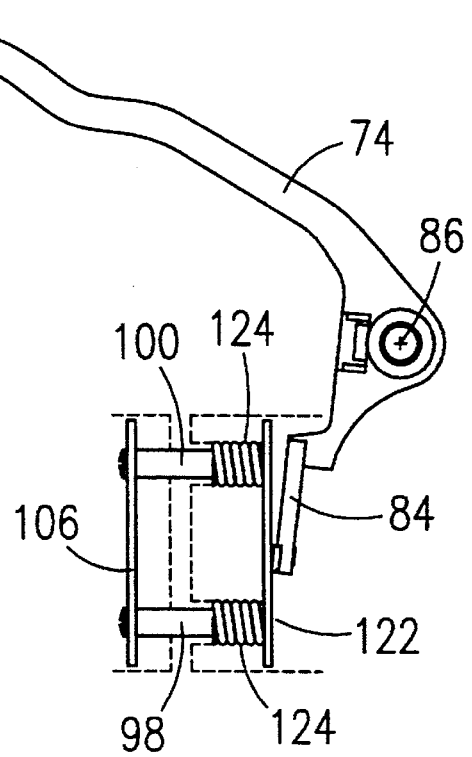
FIG. 12 is a view as in FIG. 11 with the trigger in an operating position.
Figure 13:
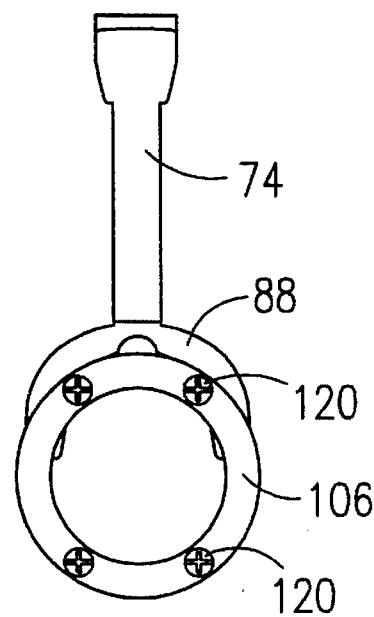
FIG. 13 is a front elevation view of the trigger and plate assembly.

By pivoting the bail assembly 42 in the direction of arrow 72 in FIGS. 1 and 2, the bail assembly 42 is placed in the cast position. In the cast position, the line 40 is allowed to freely pay off of the spool 34. Once the desired amount of line 40 is paid out, the crank handle 24 is operated to automatically reposition the bail assembly 42 in the retrieve position through a mechanism according to the invention, that will be described in detail below.

More particularly, the present invention is directed to a mechanism for placing the bail assembly 42 into the cast position from the retrieve position therefor and for causing the bail assembly 42 to automatically move back into the retrieve position upon the completion of the cast.

The present invention employs a bail assembly actuator in the form of a trigger 74. The trigger 74 has an overall "L" shape with an elongate forwardly projecting finger engaging portion 76 and a transverse bail actuating portion 78. The bail actuating portion 78 terminates in a U-shaped yoke 80 with spaced legs 82,84. The trigger 74 is mounted to the frame 12 by a pin 86 for pivoting movement about a laterally extending axis between a rest position, shown in FIGS. 1 and 6, and an operating position, shown in FIG. 5. The trigger 74 is spring loaded towards its rest position.

Drawing up on the finger actuating portion 76 of the trigger 74, and moving the trigger 74 from its rest position to its operating position, advances the legs 82,84 forwardly into engagement with an annular, actuation plate 88. The actuation plate 88 operates within an internal space 90 defined by an annular wall 92 on the body 94 of the rotor 20. A mounting wall 96 serves as a support for the actuation plate 88 and guides movement of the actuating plate in a fore and aft direction. The actuation plate 88 is connected to four guide posts 98,100,102,104, which are spaced equidistantly around the circumference of the actuation plate 88. The preferred means for interconnecting the guide posts 98,100, 102,104 and actuation plate 88 is described below. The guide posts 98,100,102,104 are of equal length, elongate and project substantially parallel to each other in a fore and aft direction, i.e. parallel to the center axis of the actuation plate 88.

To stabilize the posts 98,100,102,104, an annular reinforcement plate 106, having a configuration similar to the plate 88, is mounted to the free ends of the posts 98,100, 102,104. The plates 88,106 and posts 98,100,102,104 together define a unitary plate assembly.

Prior to assembly of the reinforcement plate 106, the posts 98,100,102,104 are directed through bores 108, 110,112,114, consecutively, from the rearwardly facing side 116 of the wall 96, until the posts 98,100,102, 104 project beyond the front, forwardly facing surface 118 of the wall 96. Once the reinforcement plate 106 is attached to the posts 98,100,102, 104, as by screws 120, the wall 96 is held captive between the actuating and reinforcement plates 88,106.

In one form, the posts 98,100,102,104 have a circular cross section taken transversely to their length. The bores 108,110,112,114 have a corresponding cross section to accept and guide the posts 98,100,102,104 in a fore and aft direction. This described guide arrangement assures that the movement of the entire plate assembly is consistently linear in a fore and aft line. The trigger legs 82,84 act on the rearwardly facing surface 122 of the plate 88 at diametrically opposite locations thereon to distribute the bail operating force from the trigger substantially uniformly across the plate 88 and avoid canting of the plate assembly.

The actuation plate 88 is normally biased in a rearward direction. This is accomplished by providing springs 124 (one shown) around each of the posts 98,100, 102,104 so that the springs 124 act between the rearwardly facing surface 116 of the wall 96 and the actuation plate 88.

As the actuation plate 88 is translated forwardly from a retracted position into an extended position by the trigger 74, the actuation plate 88 acts against and simultaneously pivots the force transmission arms 128,130 to cause the force transmission arms 128,130 to drive their associated bail arms 56,58 into their cast position.

The actuator arm 128 consists of first and second joinable parts 132,134. The transmission arm part 132 is situated externally of the reel whereas the transmission arm part 134 is located primarily within the rotor space 90. The arm part 134 has a cylindrical shaft 136 that projects fully through a bore 138 in the rotor wall 92 to be exposed externally of the rotor body 94. The exposed portion 140 of the arm part 134 has flats 142,144 to make keyed connection with a correspondingly configured bore in the arm part 132. A screw 146 maintains the coupled arrangement of the arm parts 132,134 through the rotor wall 92.

The arm part 134 has an elongate, curved extension 148 projecting transversely to the length of the shaft 136. The free end 150 of the extension 148 has a curved cam edge 152 which abuts to the forwardly facing surface 154 on the actuation plate 88. As the actuation plate moves from its retracted position into its extended position, the actuation plate 88 effects rotation of the extension 148, and the arm part 132 keyed thereto, in the direction of arrow 156 about the axis 158 of the shaft 136.

As the extension 148 is pivoted by the actuation plate 88, a shoulder 160 on the arm part 132 is brought to bear against a kidney-shaped pin/projection 162, which is offset radially outwardly and forwardly from the pivot axis 60 for the bail arm 56. Pivoting of the arm part 132 exerts a force on the bail assembly 42 to pivot the same in the direction of arrow 72 towards a cast position.

A coil spring 166 acts between the wall 96 and free end 150 of the extension 148 to normally bias the force transmission arm 128 oppositely to the direction of arrow 156. Bosses 168,170 are provided on the wall 96 and extension 134 respectively to penetrate and maintain the coil spring 166 in position.

The force transmission arm 130 has a similar two-part construction including an arm part 172 within the rotor space 90 and having a keyed projection 174 to mate with an arm part 176 externally of the rotor. A screw 178 maintains the keyed connection of the arm parts 172,176.

The arm part 172 has an extension 180 that is acted upon by the actuation plate 88 to effect rotation of the arm part 176 about the axis 182 of the projection 174 on the arm part 172. A similar spring biasing structure (not shown) biases the extension 180 normally into contact with the actuation plate 88.

Forward movement of the actuation plate 80 pivots the arm 130 about the axis 182 in the direction of arrow 184. A shoulder 186 engages a pin 188 on the bail arm 58. With the bail arm 58 in the solid line, retrieve position shown in FIG. 7, the pin 188 resides axially rearwardly of the bail assembly pivot axis 60. Pivoting of the arm 130 in the direction of arrow 184 effects a counterpivoting of the bail arm 58 in the direction of arrow 190.

The arms 130,132 pivot oppositely to each other about their respective axes 182,158. The axes 158,182 are parallel to but slightly offset from each other.

A further aspect of the invention is to configure the pins 162,188 and shoulders 160,186 so that there is a slight lag in operation of the pin 162 and shoulder 160 upon the trigger 74 being actuated. The pin 188 and shoulder 186 are relatively situated with the reel in a retrieve mode so that upon the actuating plate 88 moving forwardly, the shoulder 186 is abutted to the pin 188 and optimally oriented to develop a large torque on the bail arm 58. This large force that is produced as the bail assembly 42 is moved from a stationary position is often compromised in conventional structures to add to the pivot range. Once the bail arm 58 pivots in the direction of arrow 190 a predetermined amount, the shoulder 160 confronts the pin 162. The pin 162 and shoulder 160 are configured to allow the arm 128 to positively drive the bail arm 56 fully into the retrieve position of FIG. 2. In the absence of this arrangement, the shoulders 160,186 and pins 162,188 would have to be configured to all simultaneously coact, in which event the pivoting range for the bail assembly 42 would be limited to the range permitted by each pin and shoulder. Normally this range is on the order of 120° and difficult to achieve effectively with the conventional construction, given the normal space constraints and manufacturing tolerances. As noted above, this conventional construction compromises the initial force that moves the bail assembly 42 from the stationary retrieve position. With the staggered arrangement, the pivot range can be extended without sacrificing the necessary starting force.

This feature is particularly desirable with reels incorporating a line holding pin 192. The pin 192 projects in cantilever fashion from a second, L-shaped support arm 194 pivotably mounted to the free end 196 of the arm 128 for rotation about an axis 198 defined by a mounting pin 200. As the arm 128 drives the bail arm 56 into the cast position, the pin free end 202 abuts the edge 204 of the bail wire 62 to thereby block the line in the receptacle 64. Reserve travel for the bail assembly is built into the pin 162 and shoulder 160 arrangement to allow positive clamping of the pin free end 202 to the bail wire edge 204 so that the forces during casting do not overcome the clamping force of the line holding pin 192 that might cause premature line release.

With the inventive structure, pulling up on the trigger 74 moves the bail assembly 42 from the retrieve position into the cast position therefor. At the same time, the pin 192 blocks the line in the line receptacle 64, thereby obviating the need to snub the line 40 against a rod as the rod and reel are cocked in preparation for a cast. To complete the cast, the rod and reel 10 are thrust forwardly and simultaneously the trigger 74 is released. Upon release of the trigger 74, the arm 128 pivots under the force of the spring 166 to back the pin 192 off of the bail wire 62 to allow the line 40 to pay freely off of the spool 34.

Another significant aspect of the present invention is that the bail assembly 42 is movable through the trigger 74 from the retrieve position into the cast position regardless of the rotational position of the bail assembly 42. Thus, no self-centering mechanism is necessary, as is common on prior art reels which have a rotor that is operable in only a very small range of positions. The user need not concern him or herself with the position of the bail assembly 42 with the inventive structure.

Another aspect of the present invention is a novel mechanism at 206 to prevent jamming of the bail assembly 42 as it moves from the retrieve position to the cast position and for returning the bail assembly 42 from the cast position to the retrieve position upon rotation of the crank handle 24 at the completion of a cast.

A trip link 210 cooperates with the bail arm 58 and is movable thereby from the solid line retracted position in FIGS. 7 and 8 to the extended phantom line positions, as the bail assembly moves from its retrieve position into its cast position.

The trip link 210 has a substantially straight edge 212 which engages and is guided along a straight guide surface 214 defined by the rotor 20. Preferably, the edge 212 and surface 214 are straight so that the trip link 210 moves linearly between the solid line position and the phantom line position. It is not necessary, however, that the predetermined path followed by the trip link 210 be linear.

The bail arm 58 has an inwardly projecting pin 216 that engages and drives one trip link end 218 as the bail assembly 42 rotates in the direction of arrow 220 in FIGS. 7 and 8. Upon the bail assembly 42 being placed in the cast position, the opposite free end 222 of the trip link 210 projects to the phantom position A, shown in FIG. 8. Once the cast is completed, the user rotates the crank handle 24, which bears the extended trip link end 222 against a shoulder/ramp surface 224 on a trip link actuator 226 mounted on the trigger 74, as shown in FIG. 1.

The present invention comprehends a mechanism for allowing at least a portion of the trip link 210 to be deflected out of its predetermined path so that the trip link will not jam with the actuator 226. In the absence of this mechanism, there is a "dead spot" where the bail assembly 42 cannot be automatically actuated. More specifically, if the trip link free end 222 is aligned over the apex 228 of the actuator 226 as the trigger 74 is actuated, the end 222 encounters the apex 228, as seen in phantom position B in FIG. 8, so that the movement of the trip link 210 is arrested which thereby blocks movement of the bail assembly 42 fully into the cast position.

According to the invention, the trip link 210 is mounted to the rotor 20 to be repositionable, and preferably pivotable, about its free end 218 to the phantom line position C. A coil spring 232 normally biases the trip link 210 forwardly and in a clockwise direction in FIG. 8 so that the guide edge 212 and guide surface 214 are held in abutting relationship. The trip link 210 has an enlargement 234 defining a shoulder 236. The spring 232 acts between a shoulder 238 on the rotor 20 and the shoulder 236 in biasing the trip link 210 to the solid line position of FIG. 8.

According to the invention, the free end 222 of the trip link 210 has a convex cam edge 240 which, upon encountering the apex 228 of the trip link actuator 226, deflects the free end 222 of the trip link 210 to the right in FIGS. 7 and 8 against the bias of spring 232 under the force of the pin 216 acting on the trip link end 218. The cam edge 240 is guided down the ramp surface 224 sufficiently to allow the full extension of the trip link 210 to phantom position C as the bail assembly 42 moves into the cast position. The angle and circumferential extent of the ramp surface are selected to complement the angle that the trip link 210 must pivot through to allow the full requisite projection of the trip link 210.

A second enlargement 242 can be provided on the trip link 210 to define a shoulder 244 to abut a shoulder 246 on the rotor 20 to limit pivoting of the trip link 210 in a counterclockwise direction in FIGS. 7 and 8. Also, a shoulder 248 bounding a cutout in the rotor 20 abuts the trip link edge 250 to similarly limit pivoting movement of the trip link 210.

By operating the crank handle 24, the cam edge 240 on the trip link 210 encounters the ramp surface 224 to progressively urge the trip link 210 forwardly to thereby bear the trip link end 218 against the pin 216 to pivot the arm 58 sufficiently to allow the overcenter bias structure 63 to resituate the bail assembly 42 in the retrieve position.

The force transmission arm 130 is assembled in overlying relationship to the trip link 210. Consequently, the trip link 210 can be held captively in its operative position between the rotor 20 and the transmission arm 130. The rotor 20 and/or transmission arm 130 guide movement of the trip link between its extended and retracted positions.

Figure 14:
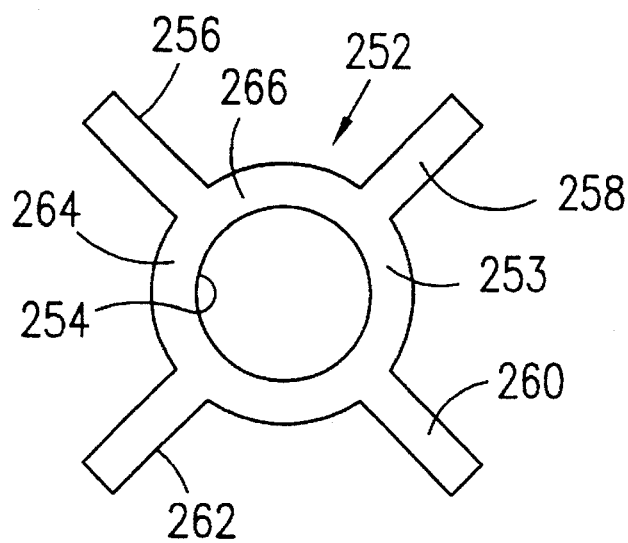
FIG. 14 is a plan view of a blank from which a unitary plate assembly can be formed.

A preferred configuration for the actuation plate assembly is shown in FIGS. 14–18. In FIG. 14, a one-piece construction for a plate assembly is shown at 252. The plate assembly consists of a single piece of sheet metal 253 that is stamped to provide a center cutout 254 and integral posts 256,258, 260,262, spaced equidistantly around the circumference of the annular center plate 264. After the stamping operation, each post 256,258,260,262 is bent through approximately 90° to project at right angles to the planar surface 266 of the plate 264.

Figure 15:
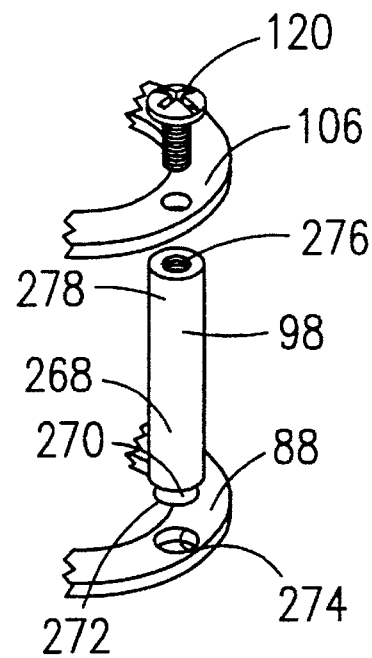
FIG. 15 is an enlarged, fragmentary, exploded perspective view of cooperating actuation and reinforcement plates and guide posts connecting therebetween according to the present invention.
Figure 16:
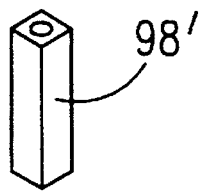
FIG. 16 is a perspective view of an alternative form of guide post on the plate assembly.
Figure 17:
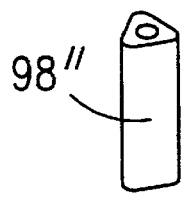
FIG. 17 is a perspective view of a still further modified form of guide post according to the present invention.
Figure 18:
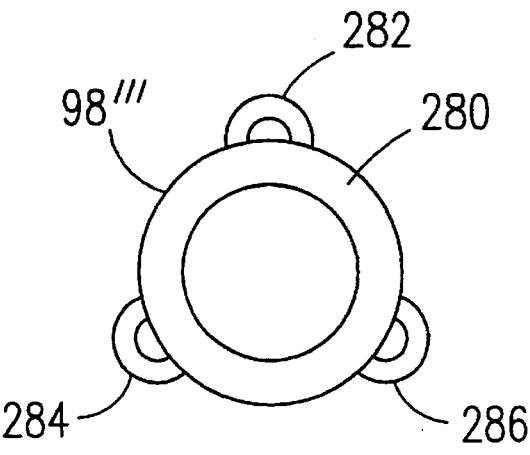
FIG. 18 is an enlarged plan view of a further modified form of guide post according to the present invention.

FIG. 15 shows a preferred means of connection between the actuation plate 88, one of the guide posts 98 and the reinforcement plate 106. The rear end 268 of the post 98 has a tapered portion 270 with a diameter that increases progressively from front to rear. The rear edge 272 of the post 98 has a diameter slightly larger than the diameter of a bore 274 in the plate 88 for reception of the post end 268. By press fitting the tapered portion 270 into the bore 274, the rear edge 272 deforms slightly and springs back with the post 98 fully seated in the plate bore 274 to effect a secure hold. A screw 120 is secured in a threaded bore 276 in the forward end 278 of the post 98.

Figure 19:
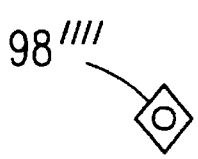
FIG. 19 is a plan view of a still further modified form of guide post according to the present invention.

FIGS. 16–19 show alternative shapes for the posts 98,100, 102,104. The post 98' in FIG. 16 has a rectangular cross-sectional configuration. The post 98" in FIG. 17 has a triangular cross-sectional configuration. The post 98'" in FIG. 18 has a cylindrical center portion 280 and three arcuate lobes 282,284,286 spaced equidistantly around the center portion 280. In FIG. 19 a post 98"" is shown and has a diamond-shaped cross-sectional configuration. The guide bores 108,110,112,114 for the posts 98,98',98",98'", 98"" have a matched cross section. However a non-matched cross section is often preferred. For example, if a triangular cross section is used in a round bore, there is contact by the post at only three points, however the guiding function is fully realized. Friction forces are thereby reduced.

The posts 98,98',98",98'",98"",100,102,104 can be made by any of a number of well known techniques, as by extrusion, molding, casting, etc. In place of the screws 120 and the tapered portion 270 that allows press fit connection, the plate assembly parts can be welded, bolted, riveted, or otherwise suitably interconnected.

For aesthetic purposes, covers (not shown) can be placed over the bail arms 56,58 and secured to the bail ears 44,46.

DESCRIPTION OF THE PREFERRED EMBODIMENT

The present invention is directed principally to a line holding mechanism 300, as shown in detail in FIGS. 20–23, that functions to prevent line 40 from freely paying off of the line carrying spool 34 with the bail assembly 42 in the cast position.

Figure 21:
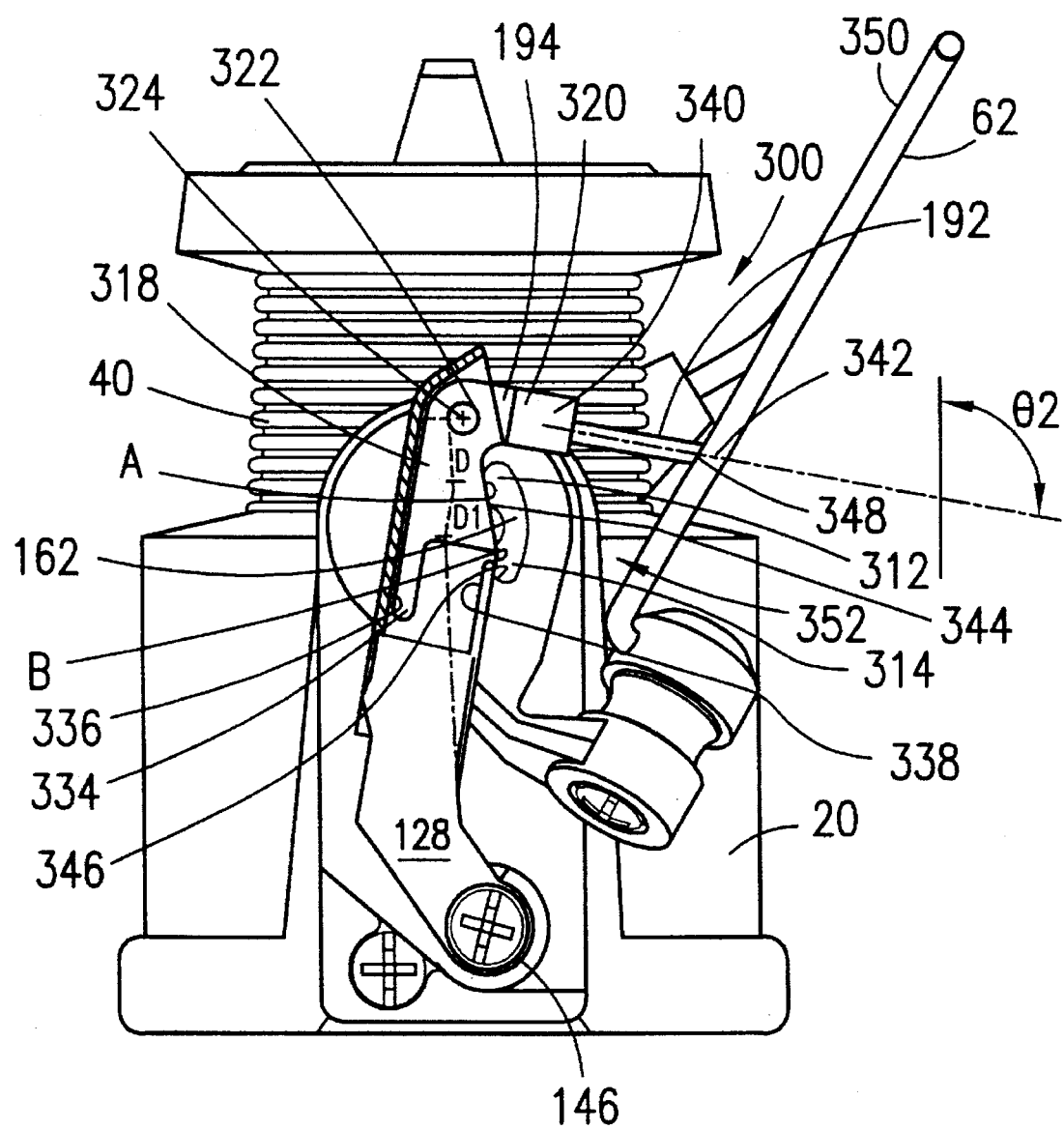
FIG. 21 is a view as in FIG. 20 with the bail assembly in a cast position and a line holding mechanism, according to the present invention, situated to block the line in a receptacle defined by the bail assembly.

The force transmission arm 128 is pivotably attached through the screw 146 to the rotor 20 for rotation about the axis 182 between the position shown in FIG. 21 and that shown in FIG. 22. A suitable mechanism, shown schematically at 302 in FIG. 20, acts between the operating trigger 74 and the arm 128. The trigger 74 is pivotable from a normal rest position, shown in solid lines in FIG. 1, to an operating position, shown in phantom lines in FIG. 1. As the trigger 74 is drawn upwardly from its rest position to its operating position, the mechanism 302 causes the force transmission arm 128 to pivot from its rest position in FIGS. 20 and 22 to the position in FIG. 21. Through an appropriate mechanism, such as a well known spring arrangement, shown schematically at 84, the arm 128 is normally urged in a counterclockwise direction around the pivot axis 182, as indicated by the arrow 306.

With the fishing reel 10 in the retrieve position of FIGS. 1 and 20, the bail assembly 42 is urged by the overcenter bias mechanism 63 in a counterclockwise direction about the rotational axis for the bail assembly 42. As the trigger 74 is moved from its rest position to its operating position, the force transmission arm 128 is moved, through the mechanism 302, in a clockwise direction about the axis 182 progressively until a shoulder 308 on the leading edge 310 abuts the pin/projection 162 integrally formed with the bail arm 56. The projection 162 is offset from the rotational axis for the bail arm 56 so that continued pivoting of the force transmission arm 128 in the clockwise direction in FIG. 20 pivots the bail arm 56, and thus the bail assembly 42, in a clockwise direction about the pivot axis 60. Upon the bail assembly 42 moving past its dead center position, the overcenter bias mechanism 63 drives the bail assembly 42 into the cast position therefor, as shown in FIGS. 21 and 22.

The projection 162 on the bail arm 56 has a kidney- or U-shaped configuration with spaced legs 312, 314 defined thereby. As the force transmission arm 128 first contacts the projection 162, the edge 316 of the leg 312 is abutted to the shoulder 308 on the arm 128. The projection 162 is configured as shown principally to cooperate with the second arm 194, which has the line-engaging pin 192 thereon, which serves to prevent free payout of the line 40 from the receptacle 64 with the bail assembly 42 in the cast position therefor.

More particularly, the arm 194 has an L-shaped configuration with first and second transverse legs 318, 320, respectively. A pin 322 projects through the arm 194 at the juncture between the first and second legs 318, 320 and defines a pivot axis 324, about which the arms 128, 194 relatively pivot. The axis 324 is substantially parallel to the pivot axis 182 for the arm 128.

In a preferred form, the arm 128 has spaced, first and second walls 326, 328, which define therebetween a receptacle 330 for the arm 194. A bore 332, extending fully through the walls 326, 328, accepts the mounting pin 322.

The arm 194 has an integral, cantilevered extension 334 which abuts oppositely facing shoulders 336, 338 on the arm 128 to thereby confine pivoting of the arm 194 relative to the arm 128 within a prescribed range, that is generally on the order of 15°.

The free end 340 of the second leg 320 on the arm 194 has a thickened portion 342 in which the pin 192 is embedded so as to project therefrom in cantilever fashion. The pin 192 has a generally cylindrical configuration with a lengthwise center line/axis 342.

As the arm 128 is moved initially into engagement with the projection 162, the projection edge 316 on the leg 312 simultaneously contacts a leading edge 344 on the arm 194 at location A. As the projection 162 contacts the pin 192, it exerts a pivoting force thereon through a moment arm D, urging the arm 194 in a clockwise direction in FIG. 21 about the axis 324. Continued rotation of the arm 128 causes the edge 346 on the other leg 314 of the projection 162 to contact the arm 194 at a location B. The moment arm for the force exerted by the projection leg 314 on the arm 194 is longer by an amount D1 than the moment arm with the length D. Resultingly, a more positive torque is exerted by the projection leg 314 than the leg 162 on the arm 194. The significance of this will be described below.

As the bail assembly 42 approaches the cast position, the overcenter bias mechanism 63 positively drives the bail assembly fully into the cast position. The line holding function is achieved by further moving and pressing the free end 348 of the pin 192 against an edge 350 of the bail wire 62 on the bail assembly until the line-engaging position for the pin 192, as shown in FIG. 21, is realized. The line 40 passes through a fully enclosed receptacle 352, that is bounded by the bail assembly 42 and the arms 128, 194. It is thus important that the pin free end 348 be positively abutted to the bail wire edge 350 so that the line 40 does not squeeze therebetween. The urging force on the pin 192 must also be sufficient that the line 40 being drawn against the pin 192 does not pivot the arm 194, as might cause premature release of the line 40.

As the cast is initiated, the user thrusts the fishing reel 10 in the direction of the cast. Simultaneously, the user releases the trigger 74, which allows the arm 128 to pivot back out of the line-engaging position towards the FIG. 22 position under the force of the spring 84. The line 40, at the time the trigger 74 is released, is abutted to the pin edge 354. As the angle θ (FIG. 22) between the plane through the center of the bail wire 62 and the line 342 is reduced, by pivoting of the arm 128 and arm 194, the line 40 slides along the pin edge 354 and eventually escapes off of the free end 348 thereof to allow unimpeded payout of line 40 from the spool 34. The friction characteristics of the material making up the pin 192 determine the exact angle at which separation occurs.

Regardless of the material used for the pin 192, it is desirable that the line 40 separate promptly upon the trigger 74 being released from its operating position so that the line 40 does not snag on the pin 192 as the reel 10 is thrust forwardly during the cast.

The two arm arrangement assures this prompt release. If the pin 192 is attached to a one-piece arm 128, due to the substantial distance between the arm pivot axis 182 and the pin 192, the arm 128 would be required to pivot through a substantial distance. This is a condition common to triggers mounted to the reel frame 12 versus the rotor 20. For example, the pin line 342 is preferably situated to make an angle θ2 of 101° to vertical. The angle θ2 must be reduced to approximately 71° to release the line 40. This requires pin reorientation through about 30°. For a one-piece arm, 30° of rotation is very large.

With the additional arm 194, the line 40 can independently pivot the arm 194 to reorient the pin 194 to allow rapid separation. Unimpeded rotation of the arm 194 from its FIG. 21 position to that in FIG. 22 can be accomplished by a small force exerted by the line 40. There is a cumulative effect realized from the pivoting of both arms 128, 194 so that, in a typical construction, the arm 128 will move on the order of only 5° before line separation occurs.

Accordingly, the arrangement of the line holding mechanism 300, according to the present invention, may accomplish two purposes. First of all, the projection 162, through a substantial moment arm, torques the arm 194 to positively bear the pin 192 against the bail wire 62 as the trigger 74 is pulled into its operating position. At the same time, once the trigger 74 is released from its operating position, retraction of the arms 128, 194 is accomplished so as to promptly release the line 40. With the inventive structure, the user can simply operate the trigger 74 without having to physically manipulate the line.

At the same time, the inventive structure prevents "cam locking" otherwise resulting when the angle between the arm 128 and each of the pins 192 and line level approaches zero. In the event of "cam lock", the line 40 would not release from the pin 192.

The foregoing disclosure of specific embodiments is intended to be illustrative of the broad concepts comprehended by the invention.

We claim:

1. A fishing reel comprising:

a frame;

a rotor;

means for mounting the rotor to the frame for rotation about a first axis;

a line storage spool;

means for rotating the rotor;

means on the rotor for directing line onto the line storage spool as an incident of the rotor being rotated about said axis, said line directing means including a bail assembly comprising first and second bail arms and means for mounting the bail arms to the rotor for pivotable movement between a) a first position wherein the bail assembly is in a retrieve position and b) a second position wherein the bail assembly is in a cast position;

a bail actuator;

means for connecting the bail actuator to at least one of the frame and rotor for movement relative thereto between rest and operating positions;

means cooperating between the bail actuator and bail assembly for moving the bail assembly from its retrieve position into its cast position as an incident of the bail actuator moving from its rest position in its operating position; and line holding means for selectively preventing line from freely paying off of the line storage spool with the bail assembly in a cast position, said line holding means including a third arm pivotably attached to the rotor for movement between third and fourth positions and a fourth arm pivotably attached to the third arm, at least one of said third and fourth arms being engagable with line projecting off of the line carrying spool with the bail assembly in a cast position to thereby prevent line from freely paying off of the line storage spool.

2. The fishing reel according to claim 1 wherein the third and fourth arms are pivotable about substantially parallel axes.

3. The fishing reel according to the claim 1 wherein the third arm is a force transmission arm, the cooperating means including means cooperating between the bail actuator and the force transmission arm for moving the force transmission arm from its third position into its fourth position as an incident of the bail actuator moving from its rest position into its operating position, and there are means cooperating between the bail assembly and force transmission arm for moving the bail assembly from its retrieve position into its cast position as an incident of the force transmission arm moving from its third position into its fourth position.

4. The fishing reel according to claim 3 wherein the means cooperating between the bail assembly and force transmission arm comprises a projection on the bail assembly and a shoulder on the force transmission arm.

5. The fishing reel according to claim 4 wherein the at least one of the third and fourth arms has first and second transverse legs, the first leg having an edge for engaging the projection on the bail assembly, said projection on the bail assembly abutting the edge on the first leg at first and second spaced locations as the bail actuator causes the bail assembly to move from its retrieve position into its cast position, said first and second locations being spaced at different distances from the rotational axis of the one of the third and fourth arms.

6. The fishing reel according to claim 5 wherein the other of the third and fourth arms has a pin projecting in cantilever fashion therefrom and with the bail assembly in the cast position and the bail actuator in the operating position the pin on the other of the third and fourth arms engages the bail assembly, the second location being spaced further from the rotational axis of the one of the third and fourth arms than the first location so that the projection applies a larger torque to the other of the third and fourth arms upon engaging the other of the third and fourth arms at the second location than at the first location in urging the pin on the other of the third and fourth arms towards the bail assembly.

7. The fishing reel according to claim 6 wherein the projection engages the other of the third and fourth arms first at the first location and then at the second location as the bail assembly moves from the retrieve position into the cast position.

8. The fishing reel according to claim 7 wherein the projection engages the other of the third and fourth arms with the pin on the other of the third and fourth arms engaging the bail assembly with the bail assembly in its cast position.

9. The fishing reel according to claim 4 wherein the projection has a U-shaped configuration with spaced first and second legs to engage spaced locations on one of the third and fourth arms.

10. The fishing reel according to claim 1 wherein at least one of the third and fourth arms has a pin projecting in cantilever fashion therefrom and with the bail assembly in the cast position and the bail actuator in the operating position the pin on the at least one of the third and fourth arms engages the bail assembly.

11. The fishing reel according to claim 1 wherein the fourth arm is pivotable relative to the third arm through a range of at least 15 degrees.

12. The fishing reel according to claim 1 wherein there are means cooperating between the third and fourth arms to limit the range of relative movement between the third and fourth arms.

13. A fishing reel comprising:

a frame;

a rotor;

means for mounting the rotor to the frame for rotation about a first axis;

a line storage spool;

means for rotating the rotor;

means on the rotor for directing line onto the line storage spool as an incident of the rotor being rotated about said axis;

said line directing means including a bail assembly comprising first and second bail arms and means for mounting the bail arms to the rotor for pivotable movement between a) a first position wherein the bail assembly is in a retrieve position and b) a second position wherein the bail assembly is in a cast position;

a bail actuator;

means for connecting the bail actuator to at least one of the frame and rotor for movement between rest and operating positions; and line holding means for selectively preventing line from freely paying off of the line storage spool with the bail assembly in a cast position, said line holding means including a third arm attached to the rotor for movement relative thereto between third and fourth positions and a fourth arm, said fourth arm being selectively engageable with line projecting off of the line carrying spool with the bail assembly in a cast position and the fourth arm in a line engaging position to thereby prevent line from freely paying off of the line storage spool, at least a part of the fourth arm being movable relative to the third arm to facilitate free payout of line from the line carrying spool with the fourth arm moved out of the line engaging position and the bail assembly in a cast position.

14. The fishing reel according to claim 13 wherein there are means for normally biasing the third arm away from the fourth position therefor.

15. The fishing reel according to claim 13 wherein the fourth arm is pivotably connected to the third arm and the fourth arm has a pin therein that, with the fourth arm in a live engaging position, is engagable with line projecting off of the line carrying spool with the bail assembly in the cast position to prevent line from freely playing off of the line storage spool.

16. The fishing reel according to claim 15 wherein the fourth arm has an L shape with first and second transverse legs and the fourth arm is pivotably attached to the third arm for rotation about an axis that is located adjacent to the juncture of the first and second legs.

17. The fishing reel according to claim 15 wherein the third arm has first and second walls defining a receptacle therebetween and the fourth arm resides at least partially within the receptacle between the first and second walls.

18. The fishing reel according to claim 13 wherein the fishing reel has a front and rear, the third arm is pivotably attached to the rotor for rotation about a second axis and the fourth arm is pivotably attached to the third arm for rotation about a third axis, said third axis being forwardly of the second axis.

19. The fishing reel according to claim 18 further comprising means cooperating between the bail actuator and bail assembly, said means including a projection on one of the bail assembly and third arm and a shoulder on the other of the bail assembly and third arm, said projection residing between the second and third axes.

20. The fishing reel according to claim 19 wherein the projection is on the bail assembly and is U-shaped with spaced legs to engage spaced locations on the third arm.

21. The fishing reel according to claim 18 wherein there are cooperating means on the third and fourth arms to limit rotation of the fourth arm relative to the third arm in a predetermined range.

* * * * *